United States Patent [19]

Wilson et al.

[11] Patent Number: 4,876,944

[45] Date of Patent: Oct. 31, 1989

[54] PNEUMATIC LIMB CONTROL SYSTEM

[75] Inventors: James F. Wilson, Durham; Rhett T. George, Jr., Hillsborough; Zhenhai Chen, Durham, all of N.C.

[73] Assignee: Duke University, Durham, N.C.

[21] Appl. No.: 164,061

[22] Filed: Mar. 3, 1988

[51] Int. Cl.⁴ ............................................. F15B 21/02
[52] U.S. Cl. ............................................. 91/35; 91/459; 623/24
[58] Field of Search .................. 91/417 R, 459, 429, 91/35; 60/368; 623/24, 25, 26

[56] References Cited

U.S. PATENT DOCUMENTS

| | | |
|---|---|---|
| Re. 28,089 | 7/1974 | Devol . |
| 3,051,328 | 8/1962 | Brown et al. . |
| 3,144,947 | 8/1964 | Pittwood . |
| 3,279,624 | 10/1966 | Devol . |
| 3,476,266 | 11/1969 | Devol . |
| 3,501,776 | 3/1970 | Beeker et al. ............... 623/26 X |
| 4,262,784 | 4/1981 | Sibeud ............... 91/429 X |
| 4,281,584 | 8/1981 | Onken et al. ............... 91/459 X |
| 4,339,984 | 7/1982 | Huhne . |
| 4,379,335 | 4/1983 | Kirsch et al. . |
| 4,442,753 | 4/1984 | Pouri et al. . |
| 4,481,768 | 11/1984 | Goshorn et al. ............... 91/429 X |
| 4,538,644 | 9/1985 | Knutson et al. ............... 91/459 X |
| 4,727,791 | 3/1988 | Satoh ............... 91/459 X |
| 4,763,560 | 8/1988 | Sasaki ............... 91/459 X |
| 4,766,921 | 8/1988 | Williams ............... 91/459 X |

FOREIGN PATENT DOCUMENTS 118581  6/1958  U.S.S.R. .............................. 623/26

*Primary Examiner*—Edward K. Look
*Attorney, Agent, or Firm*—Richard E. Jenkins

[57] ABSTRACT

An electronic pneumatic limb control system for a pneumatically actuated flexible limb is disclosed. The system includes a computer for providing signal data corresponding to a plurality of successive events of air introduction and non-air introduction, respectively, into the flexible limb during a predetermined limb movement. The computer signal data provides for time-varying the air introduction to the non-air introduction for the successive events thereof during the limb movement so as to minimize oscillation and overshoot. The system also provides for successive events of air exhaustion and non-air exhaustion to return the limb to a position of rest after the predetermined limb movement.

12 Claims, 4 Drawing Sheets

PNEUMATIC LIMB CONTROL SYSTEM

GOVERNMENT INTEREST

This invention was made with Government support under Grant MDA 903-84-C-0243 awarded by the Department of Defense. The government has certain rights in this invention.

TECHNICAL FIELD

The present invention relates to a precision control system for flexible pneumatic limb manipulators, and more particularly, to a new and useful pneumatic limb control system by means of which an exact rapid movement can be obtained without the shortcomings of overshoot or oscillation at the end of the movement of the flexible limb.

BACKGROUND ART

At the present time, electropneumatic controllers that employ compressible fluids to drive the manipulator limb are known in the art. Pneumatic manipulator limbs may be used for quite a number of applications including air brakes, control of robot-like motion, control of material handling equipment, arms and grippers and the control of limbs for walking machines. Representative pneumatically powered robotic apparatus are disclosed in U. S. Pat. No. 4,379,335 to Kirsch, et al., U. S. Pat. No. 3,476,266 to Devol and U.S. Pat. No. 4,339,984 to Huhne.

Of interest, Kirsch, et al. discloses an electronic control system for a pneumatically powered point-to-point robot. The robot movement is controlled by an electronic control system including a portable programmer and electronic controller which control solenoid valves associated with air flow to the robot. Mechanical stops are utilized to set the parameters of movement of the robot required for a particular application. Devol discloses a binary-code controlled pneumatic robotic apparatus wherein the control apparatus transmits binary-code instructions to the solenoid valve to control air flow and consequent robotic movement. A hydraulic brake is utilized to prevent erratic operation of the pneumatic robotic apparatus during a change in the actuation of fluid-pressure actuators from one combination to another so as to effect a change in robotic movement. Also of interest, Huhne discloses a drive for an industrial manipulator utilizing compressed air to and from a double-acting air cylinder through a solenoid valve arrangement controlled by an electronic control unit. An electromagnetic brake is also controlled by the electronic control unit in order to stop movement of the manipulator at a desired final position in an orderly fashion.

Although previously known pneumatic manipulator control systems have recognized the problem of accurate manipulation of a control limb and the necessity to accurately stop the manipulator or limb at the end of its predetermined movement from a first to a second position, it is not believed that the problem has been fully and adequately dealt with to date. Overshoot by a pneumatic limb of a predetermined stop point and/or oscillation around the stop point by the pneumatic manipulator or limb continues to be a problem in the pneumatically controlled manipulator field. As can be appreciated, the more complex the movement of the pneumatically controlled limb, the more difficult becomes the problem of stopping the movement at a predetermined point in an orderly fashion. Applicant has found a novel and highly effective system by which to affect rapid movement of a pneumatically controlled flexible limb without resulting in overshoot or oscillation about the end point of movement. This system is believed to be a significant advance in the field of pneumatically controlled flexible manipulator limbs.

DISCLOSURE OF THE INVENTION

In accordance with the present invention, there is provided a simple and economic pneumatic limb control system which provides for control of the movement of a pneumatic flexible manipulator limb through a predetermined movement from a first position to a second position within very close tolerance limits. The present invention provides that the movement of the pneumatic flexible limb from a first to a second position is controlled by computer means providing time-varying signal data wherein the signal data provide for varying the air introduction time in relation to the non-air introduction time during a plurality of successive events of air introduction and non-air introduction as the limb is pneumatically driven from a first position to a second position. Normally, the signal data from the computer means would provide for a greater proportion of air introduction time in relation to non-air introduction time during the plurality of successive events of air introduction and non-air introduction at the beginning of the limb movement than the proportion at the end of the limb movement. This assures that inertia is quickly overcome during required rapid movement of a pneumatic flexible limb and further serves to reduce the successive force being pneumatically applied to the limb during its movement so that the limb will not overshoot its predetermined stop point or oscillate therearound. Also, as a matter of choice, the control system may be used to exhaust the accumulated air from the flexible limb according to a predetermined plan and to thereby return the limb to a desired position with minimal overshoot and oscillation.

In other words, typically, but not necessarily, the relative times for the valve-open to valve-closed event provides for a greater valve-open to valve-closed time at the beginning of a movement than at the end of movement in order to provide precise rapid movement of a pneumatic limb. A smooth motion is achieved within specified tolerances to minimize overshoot and oscillation which are problems which pneumatic manipulation systems have labored with heretofore.

The pneumatic limb control system of the present invention comprises computer means for providing signal data corresponding to a plurality of successive events of air introduction and non-air introduction, respectively, into the limb for a predetermined movement from a first position to a second position wherein the signal data provide for varying the air introduction time in relation to the non-air introduction time for the successive events during the limb movement. Means for converting the time-varying computer signal data into corresponding time-varying electrical signals are provided and electrically connected to valve means associated with said pneumatic limb and adapted to introduce pressurized air into the limb and to close in order to prevent air introduction into the limb for the successive events according to the time-varying electrical signals from the converting means. Normally, the signal data from the computer means would provide for a greater air introduction time in relation to non-air introduction time for the successive events of air introduction and non-air introduction at the beginning of the limb movement in order to overcome inertia and to initiate rapid movement of the limb. At the end of the limb movement, the signal data from the computer means would provide for relatively reduced air introduction time in relation to non-air introduction time for the successive events of air introduction and non-air introduction in order to assure that movement of the limb is brought to a precise stop at a predetermined position within specified tolerances with a minimum overshoot and oscillation by the limb.

An object of the invention is to provide a pneumatic limb control system for imparting precise movement to a pneumatic flexible limb and bringing it to a precise stop within specified tolerances with a minimum overshoot and oscillation.

Another object of the invention is to provide a pneumatic limb control system for imparting precise movement to a pneumatic flexible limb and bringing it to a precise stop at the end of a predetermined movement without the necessity for use of a mechanical or electromechanical brake mechanism.

A further object of the invention is provide a pneumatic flexible limb control system for movement of a pneumatically manipulated limb which incorporates timevarying episodes of air introduction and non-air introduction as a means to provide a precise brake at the end of a rapid movement by the limb.

Some of the objects of the invention having been stated, other objects will become evident as the description proceeds, when taken in connection with the accompanying drawings.

DETAILED DESCRIPTION OF THE DRAWINGS

BEST MODE FOR CARRYING OUT THE INVENTION

Figure 1:
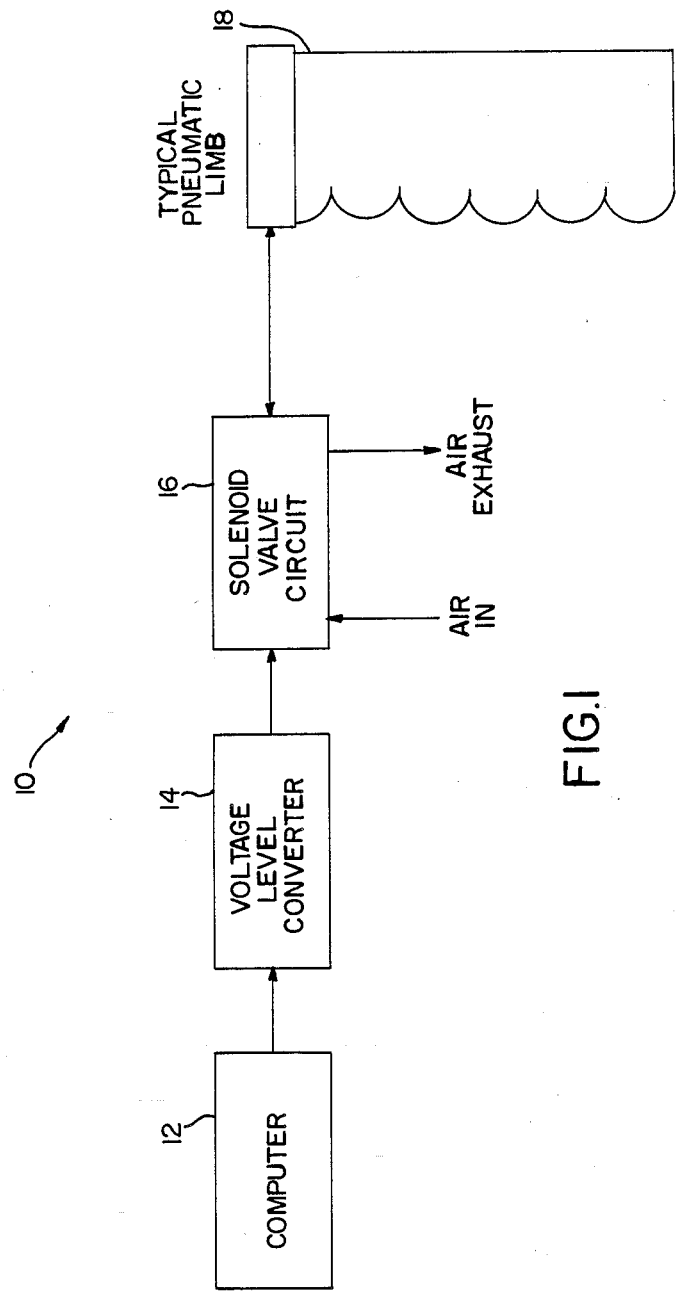
FIG. 1 is a diagrammatic illustration of a pneumatic limb control system embodying the present invention.

Referring now more specifically to the drawings, a preferred embodiment of the pneumatic limb control system according to the present invention is shown in FIG. 1 and generally designated 10. Pneumatic limb control system 10 is generally comprised of a computer 12, most suitably an IBM-PC personal computer, which has been programmed to accomplish certain desired limb manipulations in one, two or three planes. Computer 12 is electrically connected to a voltage level converter (such as an interface board or converter) 14 which converts signal data from the computer to electrical signals to operate solenoid valve circuit 16. Converter 14 may be any suitable interface device or board such as the LAB TENDER by Techmar Company which has been found to function well in the system of the present invention. Solenoid valve circuit 16 serves to admit and exhaust air from pneumatic flexible limb 18 in accordance with the signal data from computer 12. Although only a single element pneumatic limb 18 is depicted in FIG. 1, it should be appreciated that a pneumatic limb may contain any number of individual pneumatic flexible elements which would each be controlled by the aforementioned computer 12, converter 14 and solenoid valve circuit 16.

Figure 3:
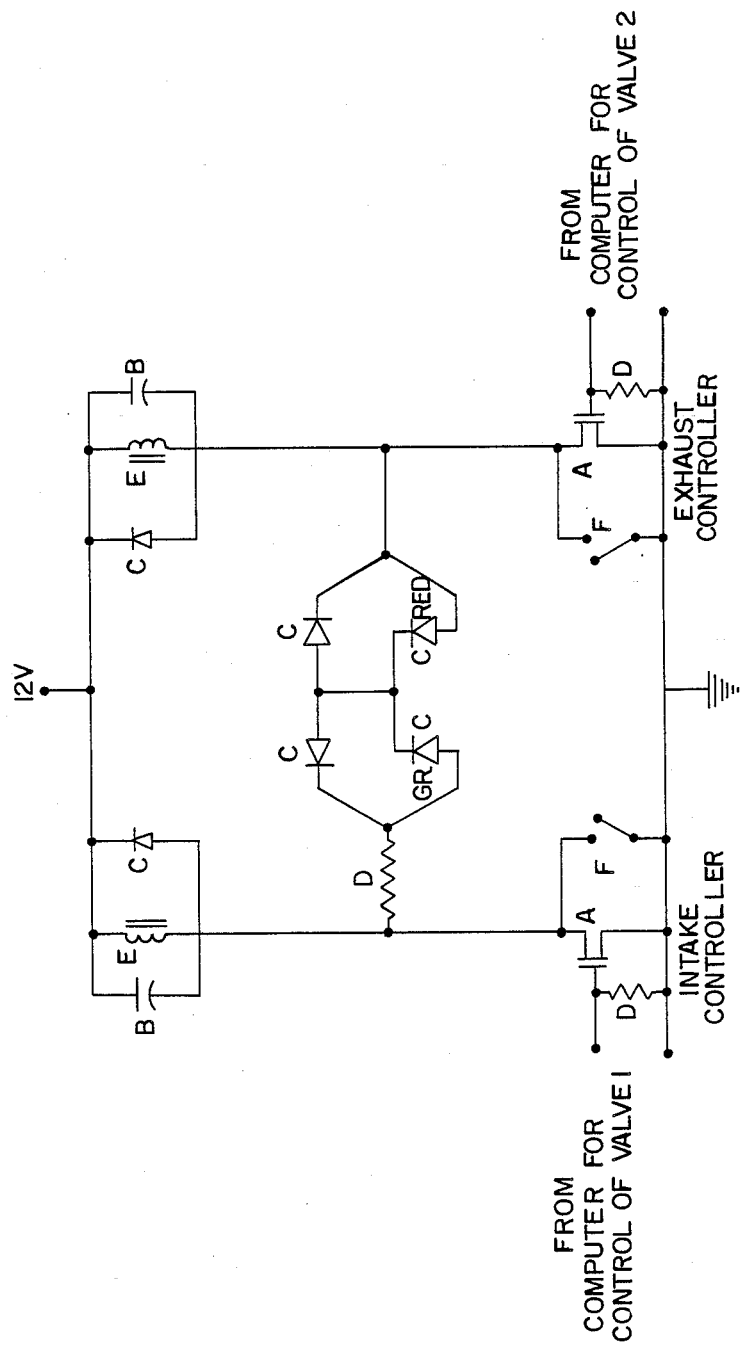
FIG. 3 is a schematic drawing of a representative electronic circuit for digital-to-discrete control of air introduction and air exhaust from a pneumatic limb.
Figure 4:
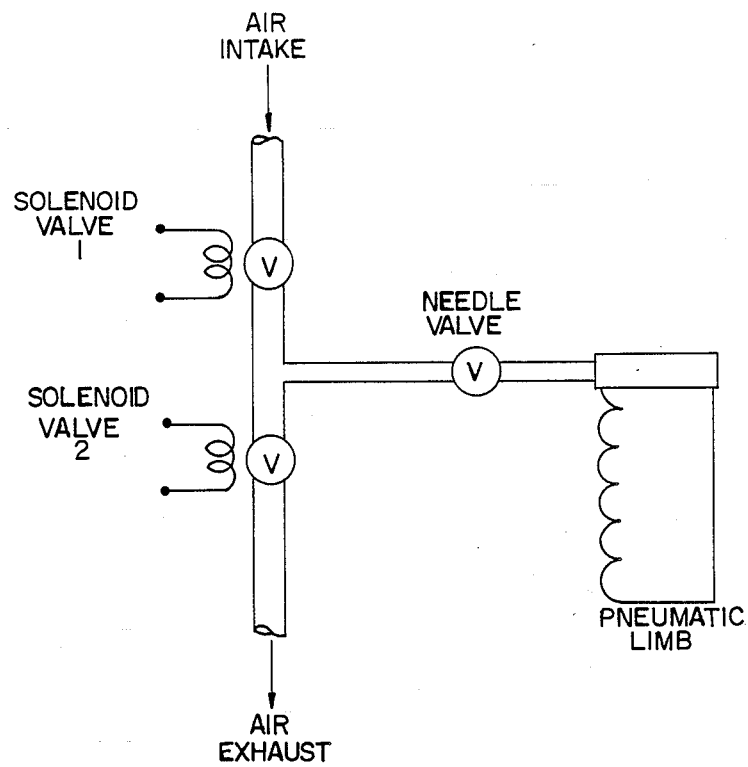
FIG. 4 is a schematic representation of a representative fluid circuit for control of a pneumatic limb.

Reference should also be initially made to FIG. 3 which depicts a representative electronic circuit for an electropneumatic controller for converter 14 which accepts control signals from the converter and transmits the signals to valve circuit 16, and to FIG. 4 which depicts a representative fluid circuit for solenoid valve circuit 16. The circuits of FIG. 3 and FIG. 4 will be discussed in more detail hereinafter for better understanding of the instant invention, but serve only to indicate representative circuits and not to limit the pneumatic limb control system of the instant invention which contemplates that other similar circuitry may be substituted therefor within the contemplated scope of the invention.

Pneumatic limb control system 10 provides for a plurality of successive events of air introduction and non-air introduction for a single movement of limb 18 by sequencing valve-open/valve-closed events within solenoid valve circuit 16. The individual times for the successive events in the sequence are determined by computer 12 and are sufficiently short that the movement motion of limb 18 is smooth. It has been found that typically, but not necessarily, the relative times for the valve-open to valve-closed events are greater at the beginning of the movement of limb 18. As the end of the movement of limb 18 is approached, the relative time of the valve-open/ valve-closed events becomes proportionally smaller and smaller. Although there is no upper limit on the number of valve-open/valve-closed events for a movement, it has been found that 2 to 10 pairs of valve-open/valve-closed events is a practical number for movement of pneumatic limb 18 from a first position to a desired second position.

Converter 14 serves as an interface between computer 12 and solenoid valve circuit 16. In this capacity, signal data from computer 12 for each valve-open/valveclosed event may be found on a dedicated line which extends from computer 12 to converter 14 to solenoid valve circuit 16 which operates pneumatic limb 18. A representative electropneumatic controller for converter 14 is depicted in FIG. 3 and comprises field effect transistors A, capacitors B, diodes C, resistors D, solenoids E and manual contact switches F (which permit manual execution of the operation plan for limb 18). The circuitry of the controller depicted in FIG. 3 is believed to be conventional and a matter of design choice in the control system of the present invention. With reference again to FIG. 3, the computer-controlled channel for air intake serves to input signals to solenoid valve circuit 16 which provide for air introduction and non-air introduction to pneumatic limb 18. The controller of converter 14 also includes a channel which inputs an electronic signal to valve circuit 16 to exhaust the air from pneumatic limb 18 at a predetermined time after movement of the limb from a first position to a desired second position according to the program of computer 12. Exhausting of air may be done with time-varying air sequences to avoid overshoot on return of the limb to the first position or to a desired intermediate third position.

As also mentioned above, a representative fluid circuit for solenoid valve circuit 16 is depicted in FIG. 4. Valve circuit 16 comprises solenoid valve 1 which allows for successive events of air introduction and non-introduction to pneumatic limb 18. A needle valve is provided in the fluid circuit to limb 18 in order to adjust fluid flow thereto. A second valve, solenoid valve 2, is provided which will exhaust all air pressure which has been accumulated during movement of limb 18 from a first to a second position upon being signaled to do so by computer 12. Normally, exhaustion of the air from limb 18 by valve 2 of solenoid valve circuit 16 serves to return the limb to its first position or starting point prior to the controlled movement thereof and the air exhaustion may be controlled similarly to the air introduction for relatively precise control of limb movement.

Although the system shown in FIGS. 1, 3 and 4 is for manipulation of only a single pneumatic limb, it should again be noted that the pneumatic limb control system of the present invention contemplates that a limb comprising a plurality of independently manipulated pneumatic elements may be controlled by the system of the present invention. Computer 12 would commonly comprise 8, 16 or 24 output signal lines which could provide for multiple elements of a singular limb being controlled simultaneously by computer 12. Normally, each limb element would require two dedicated lines extending from computer 12 to each independently controlled pneumatic element of the pneumatic limb having electronic and fluid circuitry associated therewith such as represented in FIGS. 3 and 4. Each pair of dedicated lines would allow for successive events of independent air introduction/non-air introduction as well as exhaustion of air from the element subsequent to manipulation thereof to a predetermined point.

In the case of high flexure limbs, the elastic nature of the limb and the fluid increase the complexity of limb behavior so as to make overshoot and/or oscillation even more likely. This complexity is present because the motion of one pneumatic limb element may induce overshoot and/or oscillations in adjacent pneumatic limb elements of the pneumatic limb. The time-varying fluid excitation of the present invention may be accordingly modified to provide for control of this type of complex, multi-element pneumatic limb. Although the pneumatic limb control system of the present invention in its preferred embodiment operates without feedback with respect to the position of the limb, enhancements such as adaptive filters are contemplated could be included in the control system to monitor position, adjust the time-varying valve-open/valve-closed event sequences, and to obtain smooth operation with minimum execution time and acceptable overshoot tolerances.

Figure 2A:
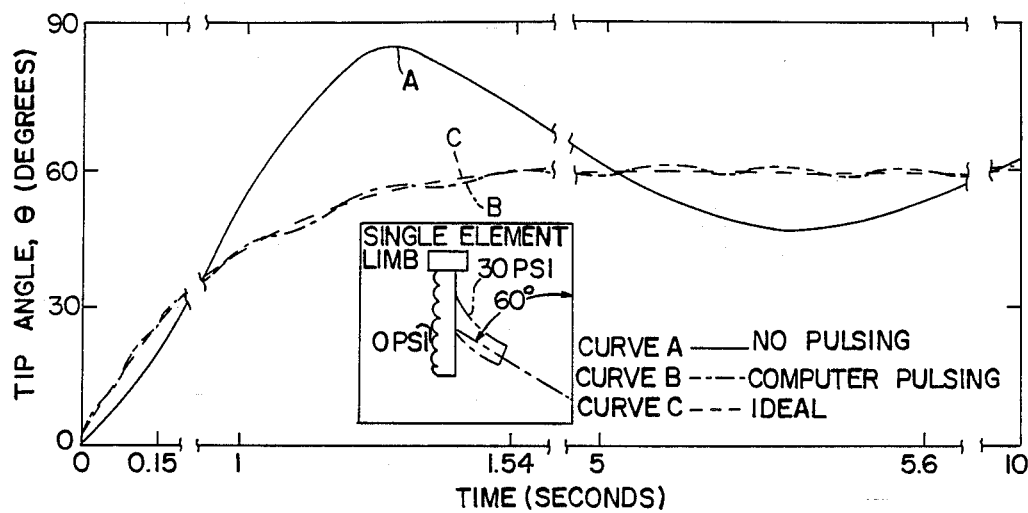
FIG. 2A–2B is a schematic representation of the time-varying sequence of successive events of air introduction and non-air introduction during movement of a pneumatic limb from a first position to a second position.
Figure 2B:
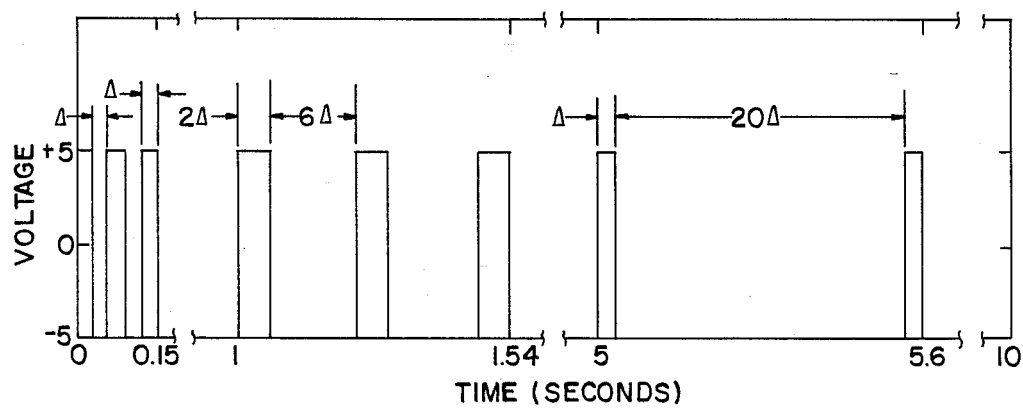

With the benefit of the prior description of the pneumatic limb control system of the present invention providing for rapid limb movement without overshoot, reference should now be had to FIGS. 2A and 2B for a more detailed description thereof. FIG. 2B shows a ten second movement of a pneumatic limb from a first position to a predetermined second position. In this instance, the movement will be presumed to be the movement of a single pneumatic limb depending downwardly in a vertical direction with the tip of the limb having a tip angle $\theta$ of 0 degrees with respect to a vertical plane extending through the longitudinal axis of the limb. The limb is pneumatically moved from the first downwardly depending position where $\theta$ is 0 degrees to an upwardly curled position where $\theta$ is 60 degrees (the longitudinal axis of the limb at its tip intersects the aforementioned vertical plane at an angle of 60 degrees) as seen in FIG. 2A. As will be noted, the initial events of air introduction and non-air introduction occur at 30 millisecond intervals and thus have a ratio of 1 to 1. This serves to quickly overcome inertia and to initiate movement of the pneumatic limb in a generally upwardly direction from its downwardly depending orientation.

FIG. 2A depicts the computer controlled movement of the pneumatic limb from a first position to the desired second position (curve B) versus the movement which would be expected without the time-varying pulsing of the instant invention (curve A) versus a theoretically ideal movement of the limb (curve C). After approximately one second of the total ten second movement, air is introduced for 60 milliseconds and is not introduced for a period of 180 milliseconds which results in a ratio of ⅓ for the successive events of air introduction and non-air introduction during this point of movement since less air is now required to move the limb and greater attention is being given to preventing overshoot and oscillation. Finally, during the final five seconds of the ten second movement air is being introduced for only 30 milliseconds and air is not being introduced for 600 milliseconds for each successive event of air introduction and non-air introduction for a ratio of 1/20. This ratio assures that the limb will be brought to its final predetermined designation in a smooth and deliberate manner with a very minimum of overshooting or oscillation about the predetermined termination point.

As can be appreciated with reference to curve B, the pneumatic limb has been moved from a first position with a tip angle of 0 degrees to a second position with a tip angle of 60 degrees with only minor oscillation caused by proper pulsing due to the successive events of air introduction and non-air introduction. Without the timevarying pulsing system of the present invention, the tip of the pneumatic limb would have followed the pathway of curve A and provided a rough oscillating motion with overshooting of desired termination point whereat tip angle $\theta$ equals 60 degrees. This type of movement would normally be created by simply introducing air into the pneumatic limb until it achieved a desired movement from one location to another. The smooth movement of the limb represented by curve B of FIG. 2A approximates ideal movement curve C; but conventional pneumatically actuated movement as represented by curve A does not at all approximate the ideal movement of curve C. Although certain specific times were utilized in the explanation of the invention as shown in FIGS. 2A and 2B, it is to be understood that these are only illustrative time periods and proportional relationships and that these particular data do not limit the scope of the present invettion.

It will be understood that various details of the invention may be changed without departing from the scope of the invention. Furthermore, the foregoing description is for the purpose of illustration only, and not for the purpose of limitation—the invention being defined by the claims.

What is claimed is:

1. A controller for a pneumatically powered flexible limb characterized in that it provides for rapid movement of said limb from a first position to a second position with minimal overshooting of said second position, and comprising:

computer means for providing signal data corresponding to a plurality of successive events of air introduction and non-air introduction, respectively, into said flexible limb for a predetermined limb movement from a first position to a second position, wherein duration of non-air introduction relative to air introduction permits the effects of inertia to dissipate, and further wherein said signal data provides for varying the air introduction time in relative to the non-air introduction time for said successive events and the time periods each consisting of an air introduction event and a non-air introduction event are variable during at least a portion of the flexible limb movement from said first position to said second position;

means for converting said time-varying signal data from said computer means into corresponding time-varying electrical signals; and valve means pneumatically connected to said flexible limb and electrically connected to said converting means for successively opening to introduce pressurized air into said flexible limb and closing to prevent air introduction into said limb for said plurality of successive events according to said ime-varying electrical signals from said converting means.

2. A controller for a pneumatically-powered flexible limb according to claim 1 wherein said signal data from said computer means generally provides for a greater air introduction time in relation to non-air introduction time for said successive events at the beginning of the limb movement than said events at the end of the limb movement.

3. A controller for a pneumatically-powered flexible limb according to claim 1 wherein said computer means is a suitably programmed personal computer.

4. A controller for a pneumatically-powered flexible limb according to claim 1 wherein said converting means comprises a digital-to-discrete converter.

5. A controller for a pneumatically-powered flexible limb according to claim 1 wherein said valve means comprises a first solenoid valve for air introduction and a second solenoid valve for air exhaustion.

6. A controller for a pneumatically-powered flexible limb according to claim 1 wherein said valve means includes means to exhaust air from said limb, and said computer means provides signal data corresponding to a plurality of successive events of air exhaust and non-air exhaust, respectively, for a predetermined limb movement from said second position to a position of rest, and wherein said signal data provide for varying the air exhaustion time in relation to the nn-air exhaustion time for said successive events during said movement from said second position to said position of rest.

7. A controller for a pneumatically-powered flexible limb according to claims 3, 4 or 5 wherein a dedicated line extends from said computer through said converter and to each of said valves.

8. A method for controlling a pneumatically-powered flexible limb so as to provide for rapid movement of said limb from a first position to a second position with minimal overshooting of said second position, comprising the steps of:

providing computer signal data corresponding to a plurality of successive events of air introduction and non-air introduction, respectively, into said flexible limb for a predetermined limb movement from a first position to a second position, wherein duration of non-air introduction relative to air introduction permits the effects of inertia to dissipate, and further wherein said signal data provide for varying the air introduction time in relation to the non-air introduction time for said successive events and the time periods each consisting of an air introduction event and a non-air introduction event are variable during at least a portion of the flexible limb movement from said first position to said second position;

converting said time-varying computer signal data into corresponding time-varying electrical signals; and utilizing said time-varying electrical signals to control pneumatic valve means in order to successively open to introduce pressurized air into said flexible limb and to close to prevent air introduction into said flexible limb for said plurality of successive events according to said time-varying electrical signals.

9. A method for controlling a pneumatically-powered flexible limb according to claim 8 wherein said computer signal data generally provides for a greater air introduction time in relation to non-air introduction time for said successive events at the beginning of the limb movement than said events at the end of the limb movement.

10. A method for controlling a pneumatically-powered flexible limb according to claim 8 wherein said computer signal data is provided by a suitably programmed personal computer.

11. A method for controlling a pneumatically-powered flexible limb according to claim 8 wherein said computer signal data is converted into corresponding electrical signals by a digital-to-discrete converter.

12. A method for controlling a pneumatically-powered flexible limb according to claim 8 wherein said valve means include means to exhaust air from said limb, and said computer signal data are provided corresponding to a plurality of successive events of air exhaust and non-air exhaust, respectively, for a predetermined limb movement from said second position to a position of rest, and wherein said signal data provide for varying the air exhaustion time in relation to the non-air exhaustion time for said successive events during said movement from said second position to said position of rest.

* * * * *